United States Patent
Dabak et al.

(10) Patent No.: US 7,154,958 B2
(45) Date of Patent: Dec. 26, 2006

(54) CODE DIVISION MULTIPLE ACCESS WIRELESS SYSTEM WITH TIME REVERSED SPACE TIME BLOCK TRANSMITTER DIVERSITY

(75) Inventors: Anand G. Dabak, Plano, TX (US); Eko N. Onggosanusi, Dallas, TX (US); Timothy M Schmidl, Dallas, TX (US); Alan Gatherer, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 688 days.

(21) Appl. No.: 09/885,878

(22) Filed: Jun. 20, 2001

(65) Prior Publication Data
US 2002/0018529 A1 Feb. 14, 2002

Related U.S. Application Data
(60) Provisional application No. 60/215,806, filed on Jul. 5, 2000.

(51) Int. Cl.
*H04B 7/06* (2006.01)

(52) U.S. Cl. .................. 375/267; 375/299; 370/335

(58) Field of Classification Search .......... 375/267, 375/232, 233, 347, 299, 144, 308, 295, 146, 375/141, 150, 343, 140, 201; 370/204, 209, 370/339, 343, 479, 480, 320, 335, 441, 342, 370/535, 310, 329, 208, 294, 295, 203, 334, 370/500, 679; 455/101, 115, 65, 69, 102, 455/103, 127.2, 129, 272, 522, 562.1; 342/359, 342/360, 373
See application file for complete search history.

(56) References Cited

U.S. PATENT DOCUMENTS
6,075,808 A 6/2000 Tsujimoto
6,256,290 B1 * 7/2001 Ramesh .............. 370/204

(Continued)

FOREIGN PATENT DOCUMENTS
DE 198 26 036 A1 12/1999

(Continued)

OTHER PUBLICATIONS
Performance analysis of CDMA transmit diversity methods; Jalloul, L.M.A, et al.; ☐☐Vehicular Technology Conference, 1999. VTC 1999—Fall. IEEE VTS 50th☐☐vol. 3, Sep. 19-22, 1999 pp. 1326-1330 vol. 3.*

(Continued)

*Primary Examiner*—Temesghen Ghebretinsae
(74) *Attorney, Agent, or Firm*—Ronald O. Neerings; W. James Brady, III; Frederick J. Telecky, Jr.

(57) ABSTRACT

A wireless communication network (10) includes a wireless transmitter having a plurality of antennas ($AT1_1$, $AT1_2$). The transmitter includes for each of a plurality of different user channels ($D^n$), circuitry ($22^n$) for providing a plurality of groups of symbols in a first symbol group sequence ($D_1^n$). Each of the plurality of different user channels includes circuitry ($24_1^n$) for forming a first modulated symbol group sequence for the user channel by modulating the symbols in the first symbol group sequence with a unique code that corresponds to the user channel and distinguishes the user channel from each other of the plurality of different user channels and circuitry ($26_1$) for combining the first modulated symbol group sequences for transmission by a first antenna ($AT1_1$). Each of the plurality of different user channels includes circuitry ($22^n$) for forming a second symbol group sequence ($D_2^n$) by time reversing symbols in at least some of the groups of symbols.

14 Claims, 5 Drawing Sheets

U.S. PATENT DOCUMENTS

| | | | |
|---|---|---|---|
| 6,259,730 B1 * | 7/2001 | Solondz | 375/232 |
| 6,304,581 B1 * | 10/2001 | Chen et al. | 370/479 |
| 6,317,411 B1 * | 11/2001 | Whinnett et al. | 370/204 |
| 6,356,528 B1 * | 3/2002 | Lundby et al. | 370/209 |
| 6,392,988 B1 * | 5/2002 | Allpress et al. | 370/208 |
| 6,400,780 B1 * | 6/2002 | Rashid-Farrokhi et al. | 375/347 |
| 6,510,173 B1 * | 1/2003 | Garmonov et al. | 375/141 |
| 6,539,209 B1 * | 3/2003 | Dajer et al. | 455/101 |
| 6,542,556 B1 * | 4/2003 | Kuchi et al. | 375/299 |
| 6,721,300 B1 * | 4/2004 | Akiba et al. | 370/342 |
| 6,721,339 B1 * | 4/2004 | Li et al. | 370/535 |
| 6,788,661 B1 * | 9/2004 | Ylitalo et al. | 370/334 |
| 6,804,307 B1 * | 10/2004 | Popovic | 375/299 |
| 6,834,043 B1 * | 12/2004 | Vook et al. | 370/310 |
| 2004/0013211 A1 * | 1/2004 | Lindskog et al. | 375/347 |

FOREIGN PATENT DOCUMENTS

| | | |
|---|---|---|
| EP | 0 771 084 A1 | 5/1997 |
| EP | 0 993 129 A2 | 4/2000 |
| EP | 1 003 297 A2 | 5/2000 |

OTHER PUBLICATIONS

Performance analysis of CDMA transmit diversity methods Jalloul, L.M.A.; Rohani, K.; Kuchi, K.; Chen, J.; Vehicular Technology Conference, 1999. VTC 1999—Fall. IEEE VTS 50th vol. 3, Sep. 19-22, 1999 pp. 1326-1330 vol. 3.*

Space time block coded transmit antenna diversity scheme for WCDMA Dabak, A.; Hosur, S.; Negi, R.; Wireless Communications and Networking Conference, 1999. WCNC. 1999 IEEE Sep. 21-24, 1999 pp. 1466-1469 vol. 3.*

Transmit diversity applied on the CDMA/TDD cellular systems; Hiramatsu, K. et al; Vehicular Technology Conference Proceedings, 2000. VTC 2000-Spring Tokyo. 2000 IEEE 51st vol. 2, May 15-18, 2000 pp. 1170-1174 vol. 2.*

Space-time transmitter diversity schemes for wideband CDMA Correia, A.; Hottinen, A.; Wichman, R.; Vehicular Technology Conference Proceedings, 2000. VTC 2000-Spring Tokyo. 2000 IEEE 51$^{st}$; vol. 1, May 15-18, 2000 pp. 313-317 vol. 1.*

"A Transmit Diversity Scheme for Channels with Intersymbol Interference", by Erik Lindskog and Arogyaswami Paulraj (cont'd) 0-7803-6286-1/00; 2000 IEEE.

* cited by examiner

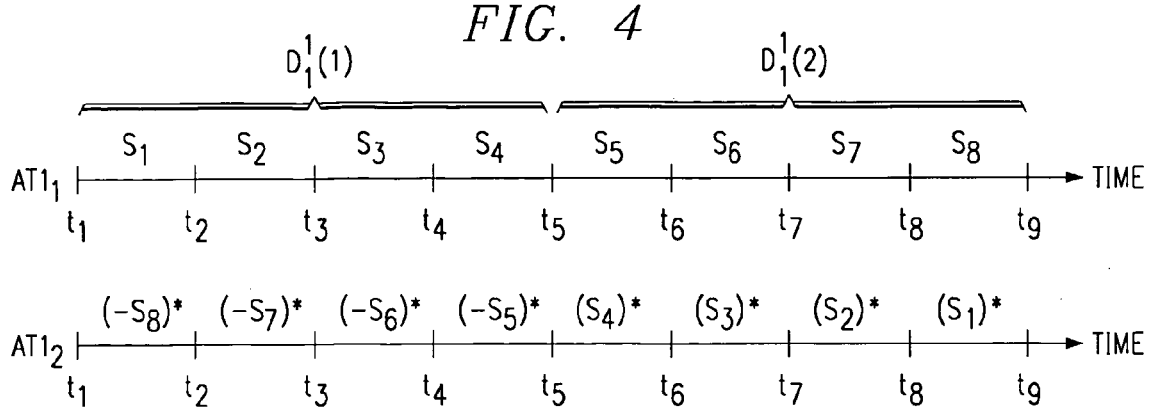
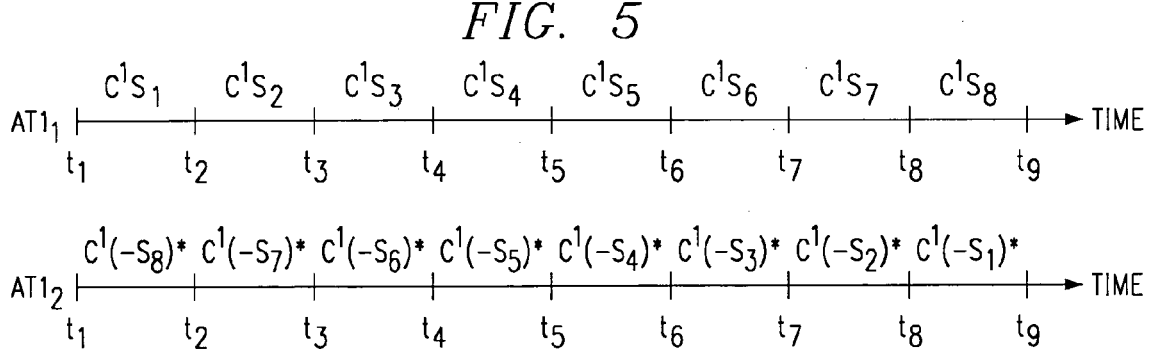
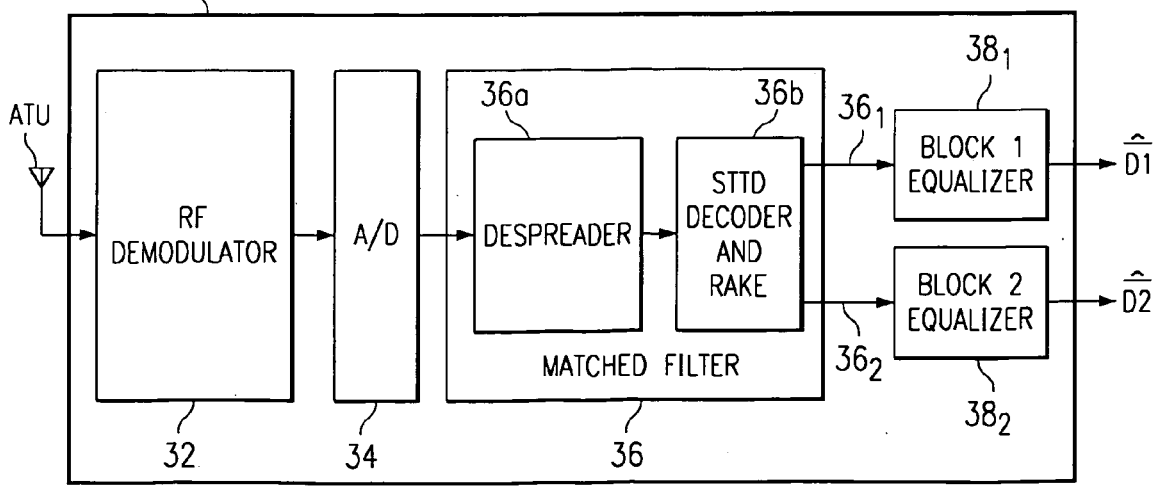

CODE DIVISION MULTIPLE ACCESS WIRELESS SYSTEM WITH TIME REVERSED SPACE TIME BLOCK TRANSMITTER DIVERSITY

CROSS-REFERENCE TO RELATED APPLICATIONS

This application claims the benefit, under 35 U.S.C. § 119(e)(1), of U.S. Provisional Application No. 60/215,806 (TI-31293PS), filed Jul. 5, 2000.

STATEMENT REGARDING FEDERALLY SPONSORED RESEARCH OR DEVELOPMENT

Not applicable.

BACKGROUND OF THE INVENTION

The present embodiments relate to wireless communications systems and are more particularly directed to reducing same user intersymbol interference ("ISI") and also reducing receiver complexity in a code division multiple access ("CDMA") cellular communications system.

Wireless communications have become very prevalent in business, personal, and other applications, and as a result the technology for such communications continues to advance in various areas. One such advancement includes the use of spread spectrum communications, including that of CDMA cellular communications. CDMA systems are characterized by simultaneous transmission of different data signals (e.g., corresponding to different users) over a common antenna channel by assigning each signal a unique code. This unique code is matched with a code of a selected user station within the cell to determine the proper recipient of a data signal.

Due to various factors including the fact that CDMA communications are along a wireless medium, an originally transmitted communication from a base station to a user station may arrive at a user station at multiple and different times. Each different arriving signal that is based on the same original communication is said to have a diversity with respect to other arriving signals originating from the same transmitted communication. Various diversity types may occur in CDMA communications, and the CDMA art strives to ultimately receive and process the originally transmitted data by exploiting the effects on each signal that are caused by the one or more diversities affecting the signal.

One type of CDMA diversity occurs because a transmitted signal from the base station is reflected by objects such as the ground, mountains, buildings, and other things that it contacts. As a result, a same single transmitted communication may arrive at the receiver at numerous different times, and assuming that each such arrival is sufficiently separated in time, then each different arriving signal is said to travel along a different channel and arrive as a different "path." These multiple signals are referred to in the art as multiple paths or multipaths. Several multipaths may eventually arrive at the user station and the channel traveled by each may cause each path to have a different phase, amplitude, and signal-to-noise ratio ("SNR"). Accordingly, for one communication between one base station and one user station, each multipath is a replica of the same user information, and each path is said to have time diversity relative to other mulitpath(s) due to the difference in arrival time which causes different (uncorrelated) fading/noise characteristics for each multipath. Although multipaths carry the same user information to the receiver, they may be separately recognized by the receiver based on the timing of arrival of each multipath. More particularly, CDMA communications are modulated using a spreading code which consists of a series of binary pulses, and this code runs at a higher rate than the symbol data rate and determines the actual transmission bandwidth. In the current industry, each piece of CDMA signal transmitted according to this code is said to be a "chip," where each chip corresponds to an element in the CDMA code. Thus, the chip frequency defines the rate of the CDMA code. Given the use of transmission of the CDMA signal using chips, then multipaths separated in time by more than one of these chips are distinguishable at the receiver because of the low autocorrelations of CDMA codes as known in the art.

In contrast to multipath diversity which is a natural phenomenon, other types of diversity are sometimes designed into CDMA systems in an effort to improve signal performance, thereby improving various data accuracy measures (e.g., bit error rate ("BER"), frame error rate ("FER"), and symbol error rate ("SER")). An example of such a designed diversity scheme is antenna diversity and is introduced here since it has particular application to the preferred embodiments discussed later. Antenna diversity, or sometimes referred to as antenna array diversity, describes a wireless system using more than one antenna by a same station. Antenna diversity often proves useful because fading is independent across different antennas. The notion of a station using multiple antennas is more typically associated with a base station using multiple antennas to receive signals transmitted from a single-antenna mobile station, although more recently systems have been proposed for a base station using multiple antennas to transmit signals transmitted to a single-antenna mobile station. Each of these alternatives is further explored below.

Certain antenna array diversity techniques suggest the use of more than one antenna at the receiver, and this approach is termed receive antenna diversity. For example, in prior art analog systems, often a base station receiver was equipped with two antennas, each for receiving a signal from a single-antenna mobile station. Thus, when the single-antenna mobile station transmits to the base station, each receiver antenna provides at least one corresponding received signal for processing. By implementing multiple receive antennas, the performance of an ideal receiver is enhanced because each corresponding received signal may be separately processed and combined for greater data accuracy.

More recently there have been proposals to use more than one antenna at the transmitter, and this approach is termed transmit antenna diversity. For example, in the field of mobile communications, a base station transmitter may be equipped with two antennas for transmitting to a single-antenna mobile station. The use of multiple antennas at the base station for transmitting has been viewed as favorable over using multiple antennas at the mobile station because typically the mobile station is in the form of a hand-held or comparable device, and it is desirable for such a device to have lower power and processing requirements as compared to those at the base station. Thus, the reduced resources of the mobile station are less supportive of multiple antennas, whereas the relatively high-powered base station more readily lends itself to antenna diversity. In any event, transmit antenna diversity also provides a form of diversity from which signal performance may be improved over single antenna communications by separately processing and combining the diverse signals for greater data accuracy at the receiver. Also in connection with transmit antenna diversity and to further contrast it with multipath diversity described above, note that the multiple transmit antennas at a single station are typically within several meters (e.g., three to four meters) of one another, and this spatial relationship is also sometimes referred to as providing spatial diversity. Given the spatial diversity distance, the same signal transmitted by each antenna will arrive at a destination (assuming no other diversity) at respective times that relate to the distance between the transmitting antennas. However, the difference between these times is considerably smaller than the width of a chip and, thus, the arriving signals are not separately distinguishable in the same manner as are multipaths described above.

By way of additional background, CDMA continues to advance along with corresponding standards that have brought forth a next generation wideband CDMA ("WCDMA"). WCDMA includes alternative methods of data transfer, one being time division duplex ("TDD") and another being frequency division duplex ("FDD"). The present embodiments may be incorporated either in TDD or FDD; thus, both approaches are further introduced here. TDD data are transmitted in one of various different forms, such as quadrature phase shift keyed ("QPSK") symbols or other higher-ordered modulation schemes such as quadrature amplitude modulation ("QAM") or 8 phase shift keying ("PSK"). The symbols are transmitted in data packets of a predetermined duration or time slot. Within a data frame having 15 of these slots, bidirectional communications are permitted, that is, one or more of the slots may correspond to communications from a base station to a user station while other slots in the same frame may correspond to communications from a user station to a base station. The spreading factor used for TDD is relatively small, whereas FDD may use either a large or small spreading factor. FDD data are comparable in many respects to TDD including the use of 15-slot frames, although FDD permits a different frequency band for uplink communications (i.e., user to base station) versus downlink communications (i.e., base to user station), whereas TDD uses a single frequency in both directions.

While the preceding prior art aspects support various types of cellular communications, the present inventors have observed that the signal performance in CDMA communications may be improved further. Specifically, in CDMA systems with transmitter antenna diversity, there is some level of ISI. In the past, the focus in the CDMA art has been on this ISI as it occurs between symbols from different users. As a simplified example, consider a given time period when a first user's symbols are transmitted along a first antenna while at the same time a second user's symbols are transmitted along a second antenna; in this example, there is some amount of ISI as between the first user's symbols and the second user's symbols, and this ISI has been examined in the industry. In contrast, however, the present inventors endeavor herein to focus in an area away from the concern of the art, and instead seek to improve overall performance by looking to a different type of ISI in a CDMA system. Specifically, also during the previous example, while the first user's symbols are transmitted along the first antenna, they also are transmitted along the second antenna. As a result, there is also ISI between communications for the same user due to multipaths arising from the transmissions along the first and second antennas. Further, such ISI becomes even a larger issue in systems with more than two antennas. Accordingly, the present inventors turn their focus to these aspects and herein describe various embodiments directed thereto.

BRIEF SUMMARY OF THE INVENTION

In the preferred embodiment, there is a wireless communication network comprising a wireless transmitter. The transmitter comprises a plurality of antennas, wherein each of the plurality of antennas is operable for transmitting signals. The transmitter also comprises, for each of a plurality of different user channels, circuitry for providing a plurality of groups of symbols in a first symbol group sequence. The transmitter also comprises, for each of the plurality of different user channels, circuitry for forming a first modulated symbol group sequence for the user channel by modulating the symbols in the first symbol group sequence for the user channel with a unique code that corresponds to the user channel and distinguishes the user channel from each other of the plurality of different user channels and circuitry for combining the first modulated symbol group sequences and providing them for transmission by a first antenna. The transmitter also comprises, for each of the plurality of different user channels, circuitry for forming a second symbol group sequence by re-ordering the groups of symbols in the first symbol group sequence and further by time reversing symbols in at least some of the groups of symbols. Also for each of the plurality of different user channels, the transmitter comprises circuitry for forming a second modulated symbol group sequence for the user channel by modulating the symbols in the second symbol group sequence for the user channel with a unique code that corresponds to the user and distinguishes the user from each other of the plurality of different user channels. Finally, the transmitter comprises circuitry for combining the second modulated symbol group sequences and providing them for transmission by the second antenna. Other circuits, systems, and methods are also disclosed and claimed.

BRIEF DESCRIPTION OF THE SEVERAL VIEWS OF THE DRAWING

FIG. 4 illustrates a timing sequence of the operational output of the modulator of FIG. 3 in ordering and processing time reversed and STTD encoded symbols to be coupled to two antennas of a base station according to the preferred embodiment.

FIG. 5 illustrates the timing sequence of FIG. 4 following the multiplication of the processed symbols by corresponding codes.

FIG. 6a illustrates a functional block diagram of a preferred receiver station for receiving and processing the signals of FIG. 5.

DETAILED DESCRIPTION OF THE INVENTION

Figure 1:
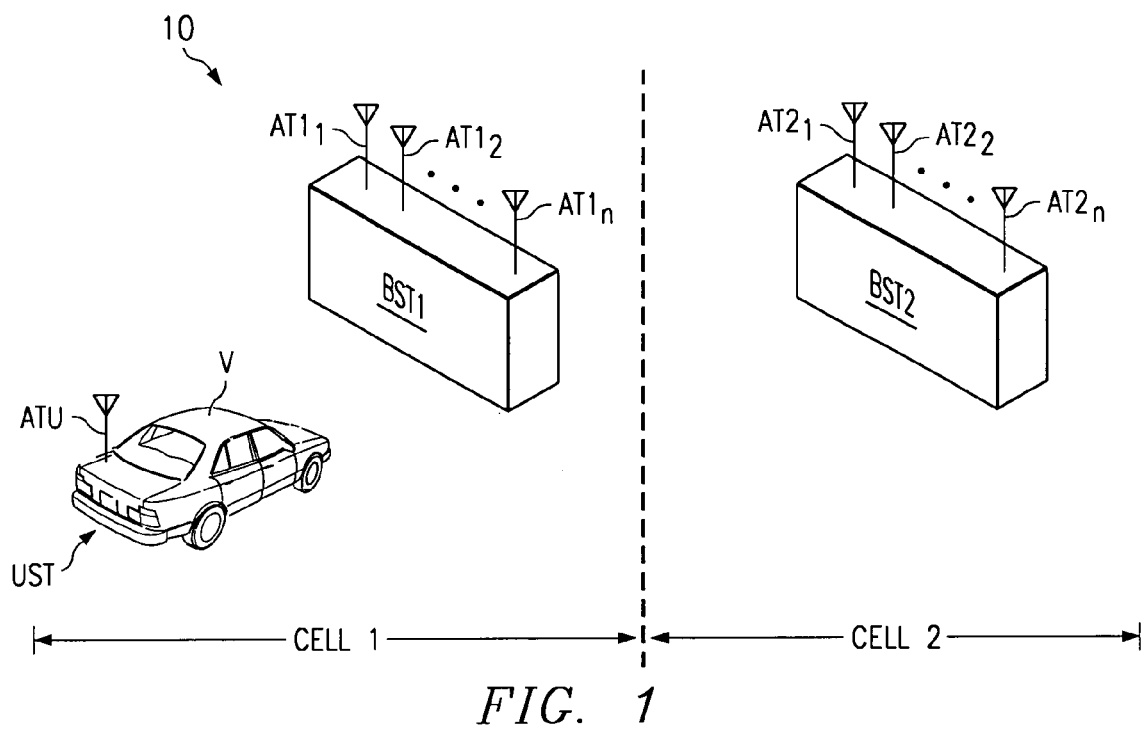
FIG. 1 illustrates a diagram of a cellular communications system by way of a contemporary code division multiple access ("CDMA") example in which the preferred embodiments operate.

FIG. 1 illustrates a diagram of a cellular communications system 10 by way of a contemporary code division multiple access ("CDMA") example, in which the preferred embodiments operate. Within system 10 are shown two base stations BST1 and BST2. Each base station BST1 and BST2 includes a respective set of antennas $AT1_1$ through $AT1_n$ and $AT2_1$ through $AT2_n$ through which each may transmit or receive CDMA signals. The general area of intended reach of each base station defines a corresponding cell; thus, base station BST 1 is intended to generally communicate with cellular devices within Cell 1, while base station BST2 is intended to generally communicate with cellular devices within Cell 2. Of course, some overlap between the communication reach of Cells 1 and 2 exists by design to support continuous communications should a communication station move from one cell to the other. Indeed, further in this regard, system 10 also includes a user station UST, which is shown in connection with a vehicle V to demonstrate that user station UST is mobile. In addition, by way of example user station UST includes a single antenna ATU for both transmitting and receiving cellular communications. Lastly, one skilled in the art should appreciate that system 10 and the preferred embodiments are applicable to various CDMA systems, including WCDMA systems.

In some respects, system 10 may operate according to known general techniques for various types of cellular or other spread spectrum communications, including CDMA communications. Such general techniques are known in the art and include the commencement of a call from user station UST and the handling of that call by either or both of base stations BST1 and BST2. Where system 10 differs from the prior art, however, is the system for, and method of, communicating signals from each of the set of base station antennas (e.g., $AT1_1$ through $AT1_n$) to user station UST as well as the reduction in complexity of the receiving apparatus in user station UST as a result thereof. These distinctions are further detailed below in connection with FIGS. 2 through 8.

Figure 2:
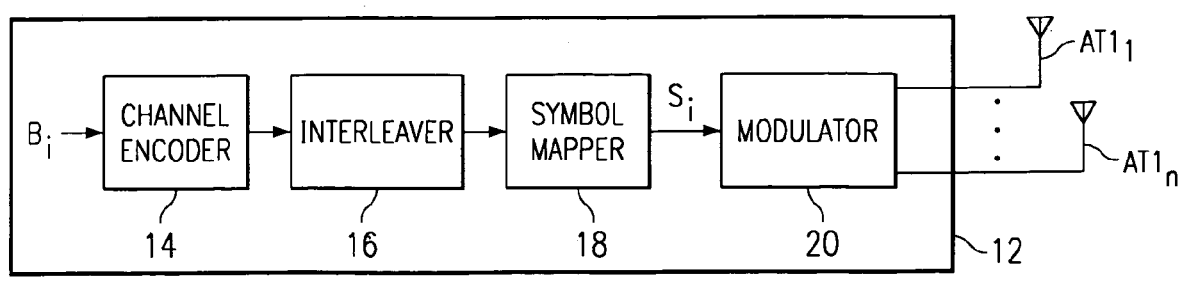
FIG. 2 illustrates a functional block diagram of a transmitter according to the preferred embodiment.

FIG. 2 illustrates a block diagram of a transmitter 12 according to the preferred embodiment and which may be used for either or both of base stations BST1 and BST2 in FIG. 1. In various respects, transmitter 12 may be constructed according to principles known in the art, but as further detailed below such known aspects are improved as a whole due to advancements in the construction and operation as relating to symbol modulating block. Turning more specifically to transmitter 12, it receives information bits $B_i$ at an input to a channel encoder 14. Channel encoder 14 encodes the information bits $B_i$ in an effort to improve raw bit error rate. Various encoding techniques may be used by channel encoder 14 and as applied to bits $B_i$, with examples including the use of convolutional code, block code, turbo code, or a combination of any of these codes. The encoded output of channel encoder 14 is coupled to the input of an interleaver 16. Interleaver 16 operates with respect to a block of encoded bits and shuffles the ordering of those bits so that the combination of this operation with the encoding by channel encoder 14 exploits the time diversity of the information. For example, one shuffling technique that may be performed by interleaver 16 is to receive bits in a matrix fashion such that bits are received into a matrix in a row-by-row fashion, and then those bits are output from the matrix to a symbol mapper 18 in a column-by-column fashion. Symbol mapper 18 then converts its input bits to symbols, designated generally as $S_i$. The converted symbols $S_i$, may take various forms, such as quadrature phase shift keying ("QPSK") symbols, binary phase shift keying ("BPSK") symbols, or quadrature amplitude modulation ("QAM") symbols. In any event, symbols $S_i$, may represent various information such as user data symbols, as well as pilot symbols and control symbols such as transmit power control "TPC" symbols and rate information ("RI") symbols.

Symbols $S_i$ are coupled to a modulator 20. Generally, modulator 20 modulates each data symbol by combining it with, or multiplying it times, a CDMA spreading sequence which can be a pseudo-noise ("PN") digital signal or PN code or other spreading code (i.e., it utilizes spread spectrum technology). By way of introduction to additional and novel aspects of modulator 20, it also imparts two additional types of encoding so as to reduce the ISI of the signal when received and decoded, namely: (1) the symbols are transmitted using space time block coded transmit antenna diversity ("STTD"); and (2) selected ones of those symbols are time reversed, where time reversal is detailed below. In all events, the spreading sequence imparted in the signal by modulator 20 facilitates simultaneous transmission of information from different users over a common channel by assigning each of the user signals a unique code during transmission. Further, this unique code makes the simultaneously transmitted signals over the same bandwidth distinguishable at a receiver (e.g., user station UST of FIG. 1 or other receivers). Modulator 20 has multiple outputs, each connected to a respective antenna $AT_1$ and $AT1_n$.

Figure 3:
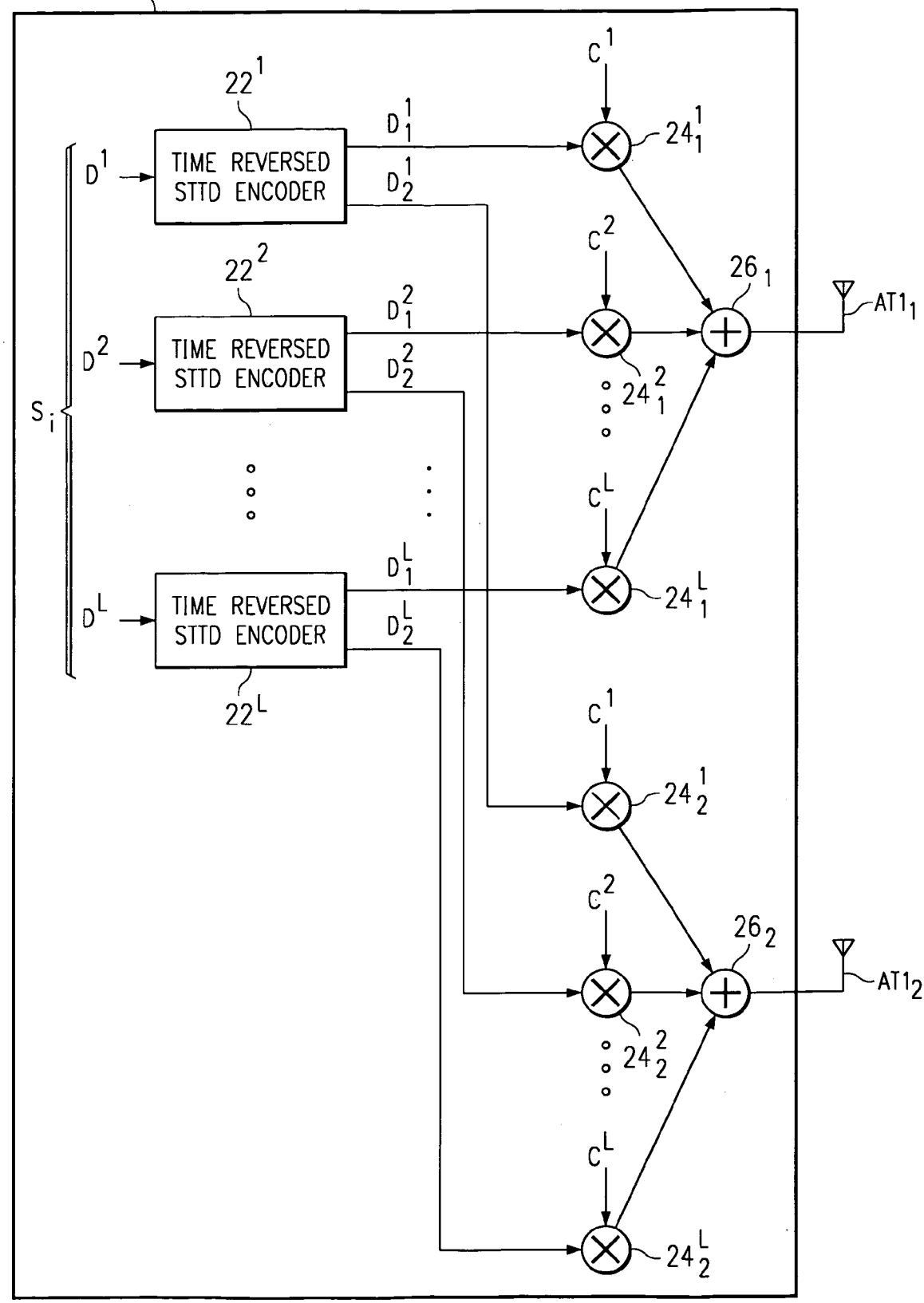
FIG. 3 illustrates a functional block diagram of a first preferred embodiment modulator as may be implemented in the transmitter of FIG. 2.

FIG. 3 illustrates a block diagram of modulator 20 from FIG. 2 and in greater detail, and one skilled in the art may readily appreciate various hardware/software implementations to achieve modulator 20 in view of the following description thereof. As discussed above, modulator 20 receives symbols $S_i$, and in FIG. 3 these symbols are subdivided into data for user channels designated $D^1$ through $D^L$, thereby indicating a total of L user channels. Each user data channel is connected as an input to a respective time reversed STTD encoder $22^1$ through $22^L$. In addition, although not shown to simplify the illustration and remaining discussion, note that modulator 20 in an expanded embodiment preferably includes additional user channels that are not STTD encoded. Returning to the embodiment as shown, and as further detailed below, each time reversed STTD encoder $22^1$ through $22^L$ outputs the data it receives in two forms along two respective outputs. Looking by way of example to time reversed STTD encoder $22^1$, along its upper output it is shown to output the data symbols in the a format designated as $D_1^1$ which, as detailed below is the same form as the input $D^1$, while along its lower output it is shown to output the data symbols in a format designated $D_2^1$. As also detailed below, this latter output is encoded using the two techniques introduced earlier, namely, STTD and time reversal. Similarly, the remaining time reversed STTD encoders $22^2$ through $22^L$ also output the data input to each in this manner, illustrated with an upper output understood as providing the input data and a lower output providing time reversed STTD data.

Each upper output $D_1''$ from a time reversed STTD encoder $22^1$ through $22^L$ is connected as an input to a respective code multiplier $24_1^1$ through $24_1^L$, and each lower output $D_2''$ from a time reversed STTD encoder $22^1$ through $22^L$ is connected as an input to a respective code multiplier $24_2^1$ through $24_2^L$. Each code multiplier multiplies its input times a different code corresponding to the user data provided at its input, where each respective code is indicated generally in the illustration. For example, with respect to code multiplier $24_1^1$, it multiplies the data $D_1^1$ at its input times a code $C^1$. The specific type of code implemented as code $C^1$ may vary, but in one common CDMA implementation code $C^1$, as well as the other comparable codes in the other code multipliers, is a Walsh code (or other PN code). For reasons more apparent later, note also that each code (e.g., $C^1$) is multiplied by one code multiplier (e.g., $24_1^1$) times a group of data (e.g., $D_1^1$) while that same code (e.g., $C^1$) is multiplied by a different code multiplier (e.g., $24_1^1$) times the time reversed STTD encoded form of that same group of data (e.g., $D_2^1$) The outputs of code multipliers $24_1^1$ through $24_1^L$ are all connected to an adder $26_1$ while the outputs of code multipliers $24_2^1$ through $24_2^L$ are all connected to an adder $26_2$. To simplify the current illustration and discussion, modulator 20 is shown as connected to only two antennas $AT1_1$ and $AT1_2$, and more particularly the output of adder $26_1$ is connected to antenna $AT1_1$ while the output of adder $26_2$ is connected to antenna $AT1_2$. From the remaining discussion, however, one skilled in the art should readily appreciate, however, how a comparable construction could be implemented with additional adders, antennas, code multipliers, and time reversed STTD encoders.

The operation of transmitter 12 is now described. In response to receiving symbols $S_i$, each time reversed STTD encoder $22^1$ through $22^L$ first buffers a number of symbols, where preferably the symbols are grouped into blocks and the number of buffered blocks equals the number of transmit antennas. In the example of FIG. 3, which has two transmit antennas $AT1_1$ and $AT1_2$, each time reversed STTD encoder $22^1$ through $22^L$ therefore buffers two blocks of symbols. For the sake of a simplified example, let $D^1$, as input to time reversed STTD encoder $22^1$, consist of the following two blocks, $D_1^1(1)$ and $D_1^1(2)$, of symbols, where the (n) designation of "1" or "2" indicates the advancement of time. For further discussion, assume these blocks have the symbols in the time sequence shown in the following Equations 1 and 2:

$$D_1^1(1)=\{S_1,S_2,S_3,S_4\} \quad \text{Equation 1}$$

$$D_1^1(2)=\{S_5,S_6,S_7,S_8\} \quad \text{Equation 2}$$

Thus, time reversed STTD encoder $22^1$ first buffers symbol blocks $D_1^1(1)$ and $D_1^1(2)$.

The next step of operation of each of time reversed STTD encoders $22^1$ through $22^L$ is now discussed in connection with an example illustrated in FIG. 4. Specifically, FIG. 4 illustrates a timing sequence of the upper and lower outputs, $D_1^1$ and $D_2^1$, respectively, of time reversed STTD encoder $22^1$. Further, these outputs of time reversed STTD encoder $22^1$ are shown in connection with antennas $AT1_1$ and $AT1_2$, respectively, as one skilled in the art will appreciate from FIG. 3 that after additional operations the symbols output by time reversed STTD encoder $22^1$ are further processed and transmitted along these respective antennas. Looking first with respect to antenna $AT1_1$, FIG. 4 illustrates as also suggested earlier that time reversed STTD encoder $22^1$ outputs at its upper output the symbols in the same order as received as data $D^1$. Thus, from times $t_1$ through $t_5$, block $D_1^1(1)$ (i.e., $S_1$ through $S_4$) is output by time reversed STTD encoder $22^1$, while from times $t_5$ through $t_9$, block $D_1^1(2)$ (i.e., $S_5$ through $S_8$) is output by time reversed STTD encoder $22^1$. During the same time, however, and for transmission along antenna $AT1_2$, time reversed STTD encoder $22^1$ performs various manipulations of the symbols for blocks $D_1^1(1)$ and $D_1^1(2)$ before outputting those blocks as data $D_2^1$. Specifically, four manipulations are made: (i) the blocks are reversed in order relative to $D^1$, that is, $D_1^1(2)$ is transmitted before $D_1^1(1)$; (ii) the complex conjugates of the symbols are formed, and as designated using an asterisk superscript in FIG. 4; (iii) the negative value of the first of the two outputted blocks is output while the positive value of the second of the two outputted blocks symbol is output so that $-D_1^1(2)$ is first output followed by $+D_1^1(1)$; and (iv) the symbols within each block are reversed in time order, meaning where a first symbol in the sequence normally immediately preceded a second symbol, the time reversal reverses that order such that once time reversed the first symbol follows immediately after the second symbol. In the example of FIG. 4, therefore, the time reversed sequence consists of $S_8$ through $S_5$ for block $D_1^1(2)$ and $S_4$ through $S_1$ for block $D_1^1(1)$. Indeed, it is noted that the first three manipulations are also described in detail in U.S. patent application Ser. No. 09/514,452, filed Feb. 25, 2000, entitled, "Space Time Transmit Diversity For TDD/WCDMA Systems," (TI-28984), which is co-assigned to the same assignee as the present application, and which is hereby incorporated herein by reference. However, the present embodiment finds even additional benefits through the implementation of the fourth stated manipulation.

For the sake of the remaining discussion, let the following conventions in Equations 3 and 4 be used to depict the outputs $D_1^1$ and $D_2^1$ of time reversed STTD encoder $22^1$.

$$D_1^1=\{D_1^1(1),D_1^1(2)\} \quad \text{Equation 3}$$

$$D_{21}^1=\{-(\overleftarrow{D}_1^1(2))^*,(\overleftarrow{D}_1^1(1))^*\} \quad \text{Equation 4}$$

Equation 3 depicts that $D^1$ includes block $D_1^1(1)$ followed by block $D_1^1(2)$ where the data in these blocks may be referred to as non-manipulated in the present context in that the symbols are not changed in any manner prior to transmission, and from the preceding it is established that time reversed STTD encoder $22^1$ passes this input along to its upper output. Equation 4 is intended to illustrate the four manipulations described above, where it is intended that the left pointing arrow (e.g., $\overleftarrow{x}$) over each block in $D_2^1$ indicates the time reversal of the order of each symbol in that block.

As indicated above, each output of each time reversed STTD encoder $22^1$ through $22^L$ is connected as an input to a respective code multiplier $24_1^1$ through $_{241}^L$, and it now may be appreciated that each such code multiplier forms a product using that input and the corresponding code illustrated in FIG. 3 as a multiplicand. Thus, FIG. 5 illustrates the timing sequence of the upper and lower outputs, $D_1^1$ and $D_2^1$, from FIG. 4, again in connection with antennas $AT1_1$ and $AT1_2$, after those outputs are multiplied times codes by code multipliers $24_1^1$ and $24_2^1$. Given the preceding conventions, therefore, the output of code multiplier $24_1^1$ may be represented as providing the two blocks of output shown in the following Equation 5:

$$C^1D_1^1=\{C^1D_1^1(1),C^1D_1^1(2)\} \quad \text{Equation 5}$$

Further, the output of code multiplier $24_2^1$ may be represented as providing the two blocks of output shown in the following Equation 6:

$$C^1D_2^1=\{-C^1(\overleftarrow{D}_1^1(2))^*,C^1(\overleftarrow{D}_1^1(1))^*\} \quad \text{Equation 6}$$

Lastly and also for later reference, the preceding observations can be generalized for all time reversed STTD encoders $22^1$ through $22^L$ and a respective code multiplier $24_1^1$ through $24_1^L$ or $24_2^1$ through $24_2^L$, such that for any time reversed STTD encoder outputting an upper signal $D_1''$ and a lower signal $D_2''$, the multipliers to which those outputs are connected provide the outputs shown in the following Equations 7 and 8:

$$C^n D_1^n = \{C^n D_1^n(1), C^n D_1^n(2)\} \qquad \text{Equation 7}$$

$$C^n D_2^n = \{-C^n(\overline{D}_1^n(2))^*, C^n(\overline{D}_1^n(1))^*\} \qquad \text{Equation 8}$$

Following the operation of code multipliers $24_1^1$ through $24_1^L$, the output of each is summed by adder $26_1$ and provided to antenna $AT1_1$. Thus, the output of adder $26_1$ may be represented by the following Equation 9:

$$\text{adder } 26_1 \text{ output} = \begin{cases} (C^1 D_1^1(1) + \ldots + C^n D_1^n(1) + \ldots + C^L D_1^L(1)), \\ (C^1 D_1^1(2) + \ldots + C^n D_1^n(2) + \ldots + C^L D_1^L(2)) \end{cases} \qquad \text{Equation 9}$$

Similarly, following the operation of code multipliers $24_2^1$ through $24_2^L$, the output of each is summed by adder $26_2$ and provided to antenna $AT1_2$. Thus, the output of adder $26_2$ may be represented by the following Equation 10:

$$\text{adder } 26_2 \text{ output} = \begin{cases} -C^1 (\overline{D}_1^1(2))^* + \ldots + -C^n (\overline{D}_1^n(2))^* + \ldots + -C^L (\overline{D}_1^L(2))^*, \\ C^1 (\overline{D}_1^1(1))^* + \ldots + C^n (\overline{D}_1^n(1))^* + \ldots + C^L (\overline{D}_1^L(1))^* \end{cases} \qquad \text{Equation 10}$$

From the preceding, it may be appreciated that antennas $AT1_1$ and $AT1_2$ transmit the signals as shown in Equations 9 and 10 above. Further, each wireless signals also obtains a respective channel effect as it passes to a receiver along with a certain amount of noise, where these additional affects are discussed later.

FIG. 6a illustrates a block diagram of a receiver 30 as a first embodiment for receiving signals communicated from transmitter 12, and one skilled in the art may readily appreciate various hardware/software implementations to achieve receiver 30 in view of the following description thereof. Further, receiver 30 may be used as an implementation of user station UST in FIG. 1. Receiver 30 is shown to include antenna ATU from FIG. 1, and it provides signals it receives to an input of an RF demodulator 32. The analog output of RF demodulator 32 is connected as an input to an analog-to-digital ("A/D") converter 34 that has its output connected as an input to a matched filter 36. Matched filter 36 includes a despreader 36a that has its input connected to the output of A/D converter 34, and the output of despreader 36a is connected to the input of an STTD decoder and RAKE block 36b. While not separately illustrated, block 36b includes a buffer sized to store a sufficient number of chips corresponding to a number of symbols, where preferably the number equals the total number of symbols transmitted by all groups communicated at one time by all antennas of transmitter 12; thus, in the example where two transmit antennas are used, then the buffer stores at least a number of chips equal to two groups of symbols, where such groups were shown by way of example in FIG. 4. Block 36b has two outputs $36_1$ and $36_2$, where output $36_1$ is connected as an input to a block 1 equalizer $38_1$ and output $36_2$ is connected as an input to a block 2 equalizer $38_1$. Block 1 equalizer 38, outputs an estimated vector of data blocks designated $\hat{D1}$ where the blocks of this vector estimate the block of data as shown in Equation 1 as well as the comparable block for all other users, while block 2 equalizer 38, outputs an estimated vector of data blocks designated $\hat{D2}$ where the blocks of this vector relate to the block of data as shown in Equation 2 as well as the comparable block for all other users. These blocks are further appreciated from the operational description below.

Figure 6B:
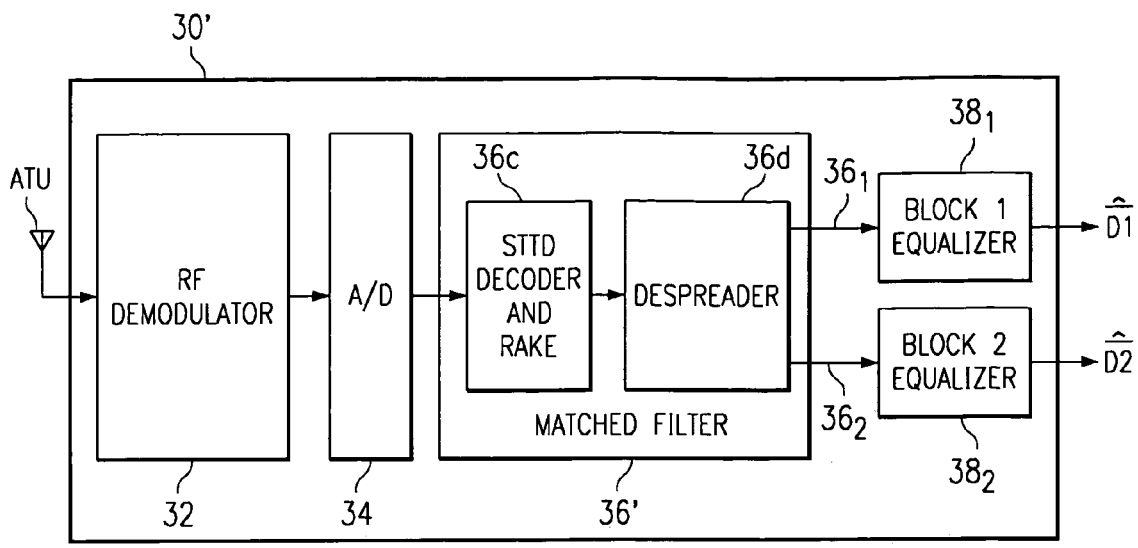
FIG. 6b illustrates a functional block diagram of an alternative preferred receiver station for receiving and processing the signals of FIG. 5.

Before discussing the operation of receiver 30, note that FIG. 6b illustrates a block diagram of a receiver 30' as a second embodiment for receiving signals communicated from transmitter 12. Receiver 30' is identical to receiver 30 of FIG. 6a with the exception of the implementation of matched filter 36' in receiver 30'. Specifically, within matched filter 36', the same block functions as illustrated in matched filter 36 are presented, but the order of connection is swapped, that is, the output of A/D converter 34 is connected to the input of an STTD decoder and RAKE block 36c, and the output of block 36c is connected as an input to a despreader 36d. Block 36d here provides the two outputs $36_1$ and $36_2$, where those outputs are connected as inputs to block 1 equalizer $38_1$ and block 2 equalizer $38_1$, respectively.

The operation of receivers 30 and 30' is now described, where the following also demonstrates how the operation of both receivers is similar and the order of the STTD decoder and RAKE function (i.e., blocks 36b and 36c) relative to the despreading function (i.e., blocks 36a and 36d) may be reversed as described below. In addition, from the following operational description, one skilled in the art may develop various hardware and/or software techniques for implementing these block devices, and with respect to the STTD decoder and RAKE function one example of such an implementation may be found in U.S. patent application Ser. No. 09/205,029 (TI-28441), filed Dec. 3, 1998, and hereby incorporated herein by reference. Turning now to the operation of receiver 30 (and 30'), radio frequency signals are received by receive antenna ATU, downconverted by demodulator 32, and converted from analog to digital signals by A/D converter 34, all as known in the art. In addition, as known in the CDMA art, where there are multiple signals all received according to a common channel and with noise, such as is the case with respect to signals received by receiver 30 from transmitter 12, then such signals are commonly processed by a matched filter in order to reduce the effects of noise, that is, to improve the SNR of those signals. In the preferred embodiment, therefore, the signals from A/D converter 34 are processed by such a matched filter in the form of matched filter 36 (or 36'), but as particularly detailed below matched filter 36 (or 36') should be specifically constructed to accommodate the various manipulations of the symbols as encoded by transmitter 12. In addition, because the despreading function and the STTD decoding and RAKE functions are linear operations as shown mathematically below, then the order these two functions can be swapped thereby giving rise to either filter

36 of FIG. 6a or filter 36' of FIG. 6b. In any event, each output of matched filter 36 (or 36') represents a sequence of processed symbol signals. Also, as proven below the preferred embodiment permits these symbols to be processed separately by equalizers 38$_1$ and 38$_2$ in view of the manner in which they were transmitted by transmitter 12, thereby reducing the complexity of receiver 30 (or 30').

The operation of matched filter 36 (or 36'), block 1 equalizer 38$_1$, and block 2 equalizer 38$_2$ is now explained based on the following derivation of the properties of those devices. Specifically, recall the earlier convention wherein data $D^1$ consists of the two blocks, $D_1^1(1)$ and $D_1^1(2)$. Given these blocks and recalling the illustration of modulator 20 in FIG. 3, let the net composite response for the user corresponding to data $D_1^1$ from antenna AT1$_1$ be as shown in the following Equation 11:

$$g_1^1(n) = H_1(n)C^1(n) \quad \text{Equation 11}$$

where $H_1(n)$ is the channel impulse response from antenna AT1$_1$ and indicates the convolution of signals. Similarly, let the net composite response for the user corresponding to data $D_2^1$ from antenna AT1$_2$ be as shown in the following Equation 12:

$$g_2^1(n) = H_2(n)C^1(n) \quad \text{Equation 12}$$

where $H_2(n)$ is the channel impulse response from antenna AT1$_2$. From Equations 11 and 12, the following Z transforms in Equations 13 and 14 can be taken, respectively:

$$G_1^1(Z) = \Sigma g_1^1(n) Z^{-n} \quad \text{Equation 13}$$

$$G_2^1(Z) = \Sigma g_2^1(n) Z^{-n} \quad \text{Equation 14}$$

Further from the properties of Z-transform, the following Equations 15 and 16 may be stated:

$$G_1^1(Z^{-1}) = \Sigma g_1^1(-n) Z^{-n} \quad \text{Equation 15}$$

is the Z-transform of the time reversed signal $g_1^1(-n)$; and:

$$G_1^1(Z^{-1}) = \Sigma g_2^1(-n) Z^{-n} \quad \text{Equation 16}$$

is the Z-transform of the time reversed signal $g_2^1(-n)$. Equations 17 and 18 set forth further properties of the Z-transform:

$$(G_1^1(Z^{-1}))^* = (G_1^1)^*(Z) \quad \text{Equation 17}$$

$$(G_2^1(Z^{-1}))^* = (G_2^1)^*(Z) \quad \text{Equation 18}$$

Having established various parameters regarding the response with respect to antennas AT1$_1$ and AT1$_2$, additional definitions may be given after which the preceding is applied thereto to develop the functionality preferably implemented in matched filter 36 (or 36'), block 1 equalizer 38$_1$, and block 2 equalizer 38$_2$. Specifically, having defined $D_1^1(1)$ and $D_1^1(2)$ as the non-manipulated symbols with respect to a single user, let the following Equations 19 and 20 define corresponding composite data blocks, where each such composite block includes the non-manipulated symbols of all users communicated simultaneously at a given time (n). Thus, Equation 19 defines a composite data block $\overline{D}1$ with respect to time (1) while Equation 20 defines a composite data block $\overline{D}2$ with respect to time (2):

$$\overline{D}1(Z) = \begin{bmatrix} D_1^1(1)(Z) \\ D_1^2(1)(Z) \\ \vdots \\ D_1^L(1)(Z) \end{bmatrix}_{LX1} \quad \text{Equation 19}$$

$$\overline{D}2(Z) = \begin{bmatrix} D_1^1(2)(Z) \\ D_1^2(2)(Z) \\ \vdots \\ D_1^L(2)(Z) \end{bmatrix}_{LX1} \quad \text{Equation 20}$$

Further let the net composite Z-transform for the channel for the data blocks be as represented in the following Equations 21 and 22:

$$\overline{G}_1(Z) = [G_1^1(Z)\ G_1^2(Z)\ \ldots\ G_1L(Z)]_{1XL} \quad \text{Equation 21}$$

$$\overline{G}_2(Z) = [G_2^1(Z)\ G_2^2(Z)\ \ldots\ G_2L(Z)]_{1XL} \quad \text{Equation 22}$$

Then the Z-transform of the net received vector for the two sub-blocks, that is, the net signals input into matched filter 36 (or 36'), is given by the following Equations 23 and 24:

$$\overline{R}1(z) = \overline{G}_1(Z)\overline{D}1(Z) - \overline{G}_2(Z)\overline{D}2^*(Z^{-1}) + \overline{N}1(Z) \quad \text{Equation 23}$$

$$\overline{R}2(z) = \overline{G}_1(Z)\overline{D}2(Z) + \overline{G}_2(Z)\overline{D}1^*(Z^{-1}) + \overline{N}2(Z) \quad \text{Equation 24}$$

which for the second sub-block of Equation 24 can be rewritten as in the following Equation 25:

$$\overline{R}2^*(z^{-1}) = \overline{G}_1^*(Z^{-1})\overline{D}2^*(Z^{-1}) + \overline{G}_2(Z)\overline{D}1^*(Z-1) = \overline{N}2(Z^{-1}) \quad \text{Equation 25}$$

and where the blocks $\overline{N}1(Z)$ and $\overline{N}2(Z)$ are the Z transforms of the additive white Gaussian noise (AWGN) for data block $\overline{D}1(Z)$ and $\overline{D}2(Z)$ respectively. Putting into matrix form we get the following Equation 26:

$$\begin{bmatrix} \overline{R}1(Z) \\ \overline{R}2^*(Z^{-1}) \end{bmatrix}_{2X1} = \begin{bmatrix} \overline{G}_1(Z) & -\overline{G}_2(Z) \\ \overline{G}_2^*(Z^{-1}) & \overline{G}_1^*(Z^{-1}) \end{bmatrix}_{2X2L} \begin{bmatrix} \overline{D}1(Z) \\ \overline{D}2^*(Z^{-1}) \end{bmatrix}_{2LX1} + \begin{bmatrix} \overline{N}1(Z) \\ \overline{N}2^*(Z^{-1}) \end{bmatrix}_{2X1} \quad \text{Equation 26}$$

In Equation 26, therefore, it may be seen that it provides components with respect to the conjugate transpose, the data, and the noise.

Having derived the preceding, the preferred operational requirements of block 1 equalizer 38$_1$ and block 2 equalizer 38$_2$ are established first by recognizing that the signals to those equalizers are first processed as a composite net signal by matched filter 36 (or 36'). Thus, according to processing theory, the effect of that matched filter may be stated as in the following Equation 27 and which also therefore provides guidance as to the preferred operational configuration of matched filter 36 (or 36') so that it achieves the factor of $\Omega$:

$$\Omega = \begin{bmatrix} \overline{G}_1(Z) & -\overline{G}_2(Z) \\ \overline{G}_2^*(Z^{-1}) & \overline{G}_1^*(Z^{-1}) \end{bmatrix}^H \quad \text{Equation 27}$$

$$= \begin{bmatrix} (\overline{G}_1(Z))^T & (\overline{G}_2(Z))^T \\ (-\overline{G}_2^*(Z^{-1}))^T & (\overline{G}_1^*(Z^{-1}))^T \end{bmatrix}_{2X2L}$$

where the notations $[\ ]^H$, $[\ ]^T$ denote the conjugate transpose and the transpose of a matrix, respectively. Next, the effect provided by the Equation 27 matched filter can be multiplied times both sides of Equation 26, yielding the following Equation 28:

$$\Omega * \begin{bmatrix} \overline{R}1(Z) \\ \overline{R}2^*(Z^{-1}) \end{bmatrix} = \Omega * \begin{bmatrix} \overline{G}_1(Z) & -\overline{G}_2(Z) \\ \overline{G}_2^*(Z^{-1}) & \overline{G}_1^*(Z^{-1}) \end{bmatrix} \begin{bmatrix} \overline{D}1(Z) \\ \overline{D}2^*(Z^{-1}) \end{bmatrix} + \quad \text{Equation 28}$$

$$\Omega * \begin{bmatrix} \overline{N}1(Z) \\ \overline{N}2^*(Z^{-1}) \end{bmatrix}$$

Let the following Equation 29 in terms of $\Lambda$ be substituted for the data-related multiplicand matrices of Equation 28:

$$\Omega_{2LX2} * \begin{bmatrix} \overline{G}_1(Z) & -\overline{G}_2(Z) \\ \overline{G}_2^*(Z^{-1}) & \overline{G}_1^*(Z^{-1}) \end{bmatrix}_{2X2L} = \begin{bmatrix} \Lambda & \Gamma \\ \Gamma^* & \Lambda \end{bmatrix}_{2LX2L} \quad \text{Equation 29}$$

where $$\Lambda = (\overline{G}_1^*(Z^{-1}))^T \overline{G}_1(Z) + (\overline{G}_2(Z))^T \overline{G}_2^*(Z^{-1});$$

and $$\Gamma = -(\overline{G}_1^*(Z^{-1}))^T \overline{G}_2(Z) + (\overline{G}_2(Z))^T \overline{G}_1^*(Z^{-1}).$$

From Equation 29, one skilled in the art may first ascertain that to therefore embody block 1 equalizer 38₁ and block 2 equalizer 38₂, one such equalizer would be directed to an implementation with respect to $\Lambda$ while the other would be directed to an implementation with respect to $\Gamma$. However, the present inventors have observed that due to the symbol level time reversal of the STTD encoding in the preferred embodiment, the matrix $\Gamma$ has zeros along the diagonal terms. In addition, the non-diagonal terms are small due to cross-correlations between the different users and can be neglected for reduced complexity and, indeed, these non-diagonal terms are even closer to zero (or some negligible amount) due to the additional implementation of symbol wise time reversal in the preferred embodiment. Given these observations, the data received from matched filter 36 (or 36') can be effectively approximated by substituting $\Gamma=0$ into Equation 28 to yield the following Equation 30:

$$\Omega_{2LX2} * \begin{bmatrix} \overline{R}1(Z) \\ \overline{R}2^*(Z^{-1}) \end{bmatrix}_{2X2} \approx \quad \text{Equation 30}$$

$$\begin{bmatrix} \Lambda & 0 \\ 0 & \Lambda \end{bmatrix}_{2LX2L} \begin{bmatrix} \overline{D}1(Z) \\ \overline{D}2^*(Z^{-1}) \end{bmatrix}_{2LX2} + \Omega_{2LX2} * \begin{bmatrix} \overline{N}1(Z) \\ \overline{N}2^*(Z^{-1}) \end{bmatrix}_{2X2}$$

Looking now to block 1 equalizer 38₁ and block 2 equalizer 38₂ in FIG. 6a (or 6b) in view of Equation 30, note that block 1 equalizer 38₁ receives a set of signals from matched filter 36 (or 36') corresponding to time n=1 (i.e., both the non-manipulated symbols and codes sent via antenna AT1₁ and the manipulated symbols and codes sent via antenna AT1₂), while block 2 equalizer 38₂ receives a set of signals from matched filter 36 corresponding to time n=2. However, the derivation of Equation 30 and the observations giving rise to it indicate that both of these sets of signals may be multiplied times the inverse of the matrix pertaining to $\Lambda$ in order to retrieve the data and, thus, the preferred embodiment of equalizers 38₁ and 38₂ operate in this manner with respect to their respective inputs. As a result, both outputs $\hat{\overline{D}}\overline{1}$ and $\hat{\overline{D}}\overline{2}$ are preferably determined in response to the inverse of the common matrix pertaining to $\Lambda$, that is, in response to $\Lambda^{-1}$. More particularly, by multiplying the signal input from output 36₁ times $\Lambda^{-1}$, block 1 equalizer 38₁ provides $\hat{\overline{D}}\overline{1}$ which is an estimate of the signals in time that correspond to $\overline{D}1$ of Equation 19, and by multiplying the signal input from output 36₂ times $\Lambda^{-1}$, block 1 equalizer 38₁ provides $\hat{\overline{D}}\overline{2}$ which is an estimate of the signals in time that correspond to $\overline{D}2$ of Equation 20. Thus, equalizer 38₁ is operable to output an estimate of the signal which reflects the channel of transmission from antenna AT₁ and separately equalizer 38₂ is operable to output an estimate of the signal which reflects the channel of transmission from antenna AT₂. The separate determinations arise from the distinct inputs, and can be achieved using dual hardware/software in parallel operation or the same hardware/software in serial operation. In either event, however, complexity is relatively reduced due to the above-discussed result of the being able to remove the matrix $\Gamma$ from the required determinations. Finally, once $\hat{\overline{D}}\overline{1}$ and $\hat{\overline{D}}\overline{2}$ are obtained, they may be used further or processed by receiver 30 (or 30') in manners ascertainable by one skilled in the art.

Before proceeding, it is noteworthy to observe that the single common matrix multiplier, $$\begin{bmatrix} \Lambda & 0 \\ 0 & \Lambda \end{bmatrix},$$

of the preferred embodiment of block 1 equalizer 38₁ and block 2 equalizer 38₂ provides considerable improvement over a system wherein one set of data would require multiplication times a first corresponding matrix while a second set of data would require multiplication times a second and different corresponding matrix. Specifically, as is known in matrix operations, for a matrix of size M, then to take its inverse involves an arithmetic complexity on the order of $M^3$. However, since Equation 30 includes a matrix having a diagonal equal to zero, then the underlying operation requires only the taking of the inverse of the diagonal matrix, thereby providing a considerably less complex evaluation. As a result, the complexity of block 1 equalizer $38_1$ and block 2 equalizer $38_2$, as compared to a system requiring additional matrix manipulations, is considerably reduced. Moreover, as discussed above with respect to transmitter 12, there is also a reduction in ISI in the incoming encoded signals.

As an additional observation regarding block 1 equalizer $38_1$ and block 2 equalizer $38_2$, note that alternative embodiments may be created given the preceding recognition that both equalizers share the mutual matrix relating to $\Lambda_1$. For example, other standard receivers like MMSE equalizers could be altered to implement the mutual matrix benefit, including either those with or without feedback. For example, instead of multiplying a set of input signals times only $\Lambda_1^{-1}$, in an alternative embodiment additional factors may be implemented such as a multiplication times a matrix of $(\Lambda_1 + \sigma^2 I)^{-1}$ as would be used to reduce mean square error. In such an instance, $\sigma^2$ is the variance of the AWGN noise and I is the identity matrix. Still other alternatives may be ascertained by one skilled in the art.

Given the preceding, the present inventors have observed that by implementing time reversal in addition to STTD in a CDMA system, ISI is removed as between antennas for the same user or transmission. For example, assume that data $D^1$ represents the symbols corresponding to a first user. From the preceding, it may be appreciated that a user's symbols in one form of $D^1$, that is, as $C^1 D_1^1$, are communicated along antenna $AT1_1$. At the same time, an alternative set of symbols, namely, $C^1 D_2^1$, are communicated along antenna $AT1_2$. The preferred embodiment of encoding in this manner eliminates the ISI from this same user data provided via antenna $AT1_1$ which would otherwise provide ISI onto antenna $AT1_2$, and it likewise eliminates the ISI from this same user data provided via antenna $AT1_2$ which would otherwise provide ISI onto antenna $AT1_1$.

Figure 7:
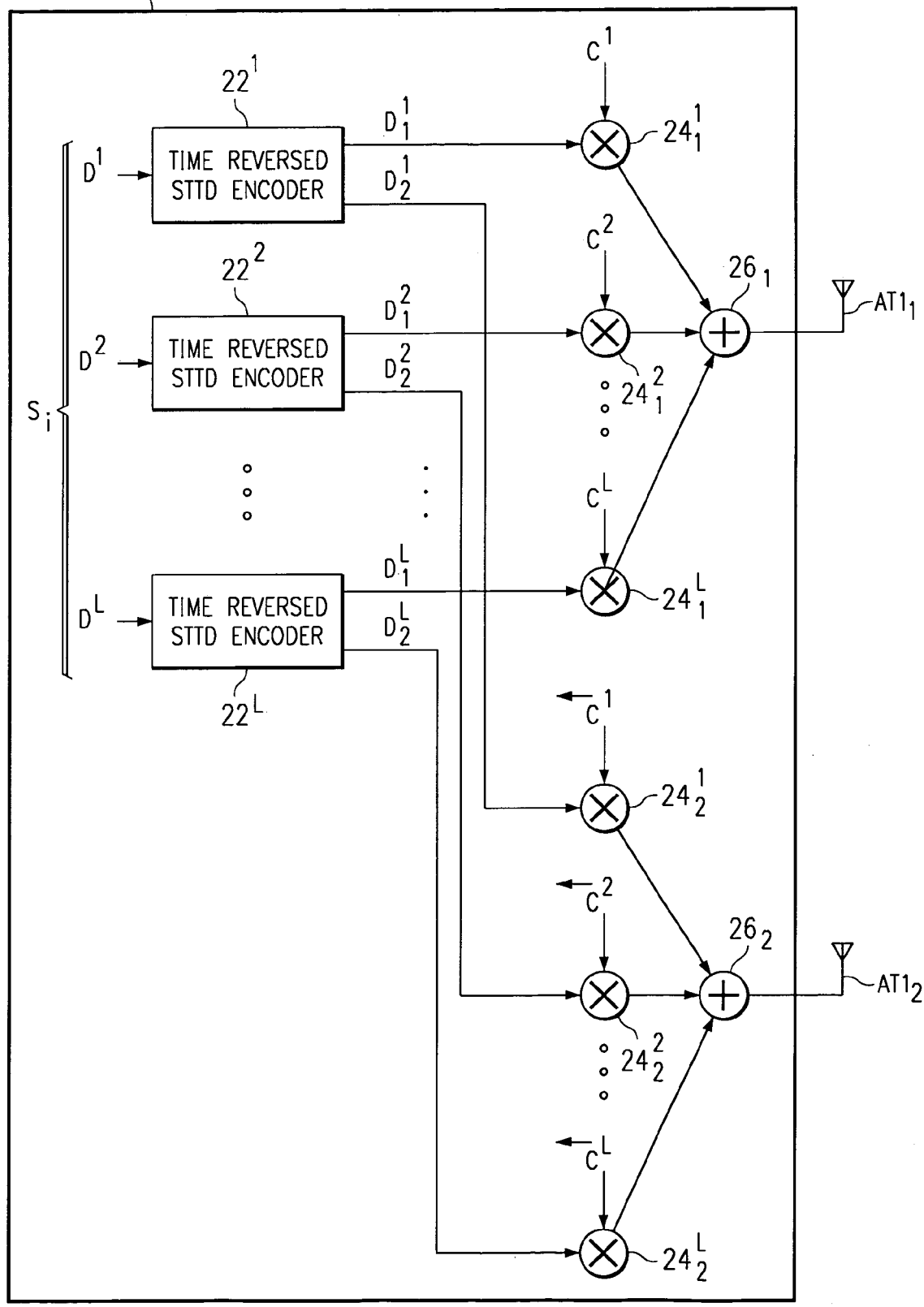
FIG. 7 illustrates a functional block diagram of a second preferred embodiment modulator as may be implemented in the transmitter of FIG. 2.

FIG. 7 illustrates a block diagram of an alternative embodiment modulator 20' for use in transmitter 12 of FIG. 1 and which implements the same functional connections as modulator 20 shown in FIG. 3, where the alternative modulator 20' of FIG. 7 varies from modulator 20 by implementing time reversal with respect to selected codes. Specifically, looking to the lower half of FIG. 7, note that the multiplicands identified in code multipliers $24_2^1$ through $24_2^L$ illustrate that the codes provided as a multiplicand by such multipliers are time reversed (using the above-introduced convention of the left pointing arrow over each code multiplicand). In contrast, the upper half of FIG. 7 is the same as FIG. 3.

The operation of modulator 20' of FIG. 7 should be readily appreciated given the previous discussion of modulator 20 and further in view of the following additional observations which also facilitate an understanding of the later-illustrated preferred embodiment receivers that receive the signals provided by modulator 20'. Similar to Equations 19 and 20, let $\overline{X}1$ be the composite signal of the spreading codes and the data block $\overline{D}1$ and $\overline{X}2$ be the composite signal of the spreading codes and the data block $\overline{D}2$ as shown in the following Equations 31 and 32:

$$\overline{X}1 = \{C^1 D_1^1(1) + C^2 D_1^2(1) + \ldots + C^L D_1^L(1)\} \quad \text{Equation 31}$$

$$\overline{X}2 = \{C^1 D_1^1(2) + C^2 D_1^2(2) + \ldots + C^L D_1^L(2)\} \quad \text{Equation 32}$$

The upper half of modulator 20' operates in the same manner as modulator 20 and, thus, reference is made to Equation 9 which designates the output to antenna $AT1_1$. With respect to the lower half of modulator 20', the output of adder $26_2$ may be represented by the following Equation 33, which one skilled in the art may readily derive given the previous Equation 10 as well as the time reversal of the codes in code multipliers $24_2^1$ through $24_2^L$:

$$\text{adder } 26_2 \text{ output} = \begin{Bmatrix} -\left(\overleftarrow{C}^1 \overleftarrow{D}_1^1(2)\right)^* + \ldots + -\left(\overleftarrow{C}^n \overleftarrow{D}_1^n(2)\right)^* + \ldots + -\left(\overleftarrow{C}^L \overleftarrow{D}_1^L(2)\right)^*, \\ \left(\overleftarrow{C}^1 \overleftarrow{D}_1^1(1)\right)^* + \ldots + \left(\overleftarrow{C}^n \overleftarrow{D}_1^n(1)\right)^* + \ldots + \left(\overleftarrow{C}^L \overleftarrow{D}_1^L(1)\right)^* \end{Bmatrix} \quad \text{Equation 33}$$

$$= \left\{-\overleftarrow{X}2^*, \overleftarrow{X}1^*\right\}$$

The signal provided according to Equation 33 provides improved signal performance at a receiving station by reducing same user ISI in a manner comparable to that described above with respect to the first embodiment. In addition, however, and as detailed below, this signal also facilitates a receiver structure with certain benefits as compared to receiver 30 of FIG. 6a (or receiver 30' of FIG. 6b).

Figure 8A:
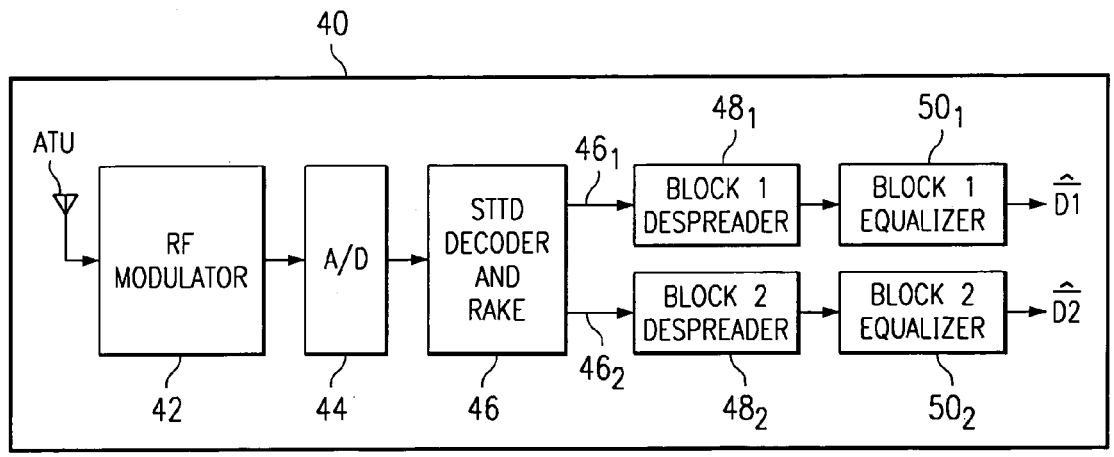
FIG. 8a illustrates a functional block diagram of a preferred receiver station for receiving and processing the signals transmitted using the modulator of FIG. 7.

FIG. 8a illustrates a functional block diagram of a preferred receiver station 40 for receiving and processing the signals transmitted using modulator 20' of FIG. 7, and again one skilled in the art may readily appreciate various hardware/software implementations to achieve receiver 40 in view of the following description thereof. Receiver 40 includes antenna ATU from FIG. 1, and it provides signals it receives to an input of an RF demodulator 42. The analog output of RF demodulator 42 is connected as an input to an analog-to-digital ("A/D") converter 44 that has its output connected as an input to an STTD decoder and RAKE block 46 which also implements the functionality of a matched filter as detailed below. While not separately illustrated, block 46 includes a buffer sized to store a sufficient number of chips corresponding to a number of symbols, where preferably the number equals the total number of symbols transmitted by all groups communicated at one time by all antennas of transmitter 12; thus, in the example where two transmit antennas are used, then the buffer stores at least a number of chips equal to two groups of symbols, where such groups were shown by way of example in FIG. 4. Block 46 has two outputs $46_1$ and $46_2$, where output $46_1$ is connected as an input to a block 1 despreader $48_1$ and output $46_2$ is connected as an input to a block 2 despreader $48_2$. The output of block 1 despreader $48_1$ is connected as an input to a block 1 equalizer $50_1$ which outputs the previously-introduced estimated vector of data blocks designated $\hat{\overline{D}1}$, and the output of block 2 despreader $48_2$ is connected as an input to a block 2 equalizer $50_2$ which outputs the previously-introduced estimated vector of data blocks designated $\hat{\overline{D}2}$. These blocks are further appreciated from the operational description below.

Figure 8B:
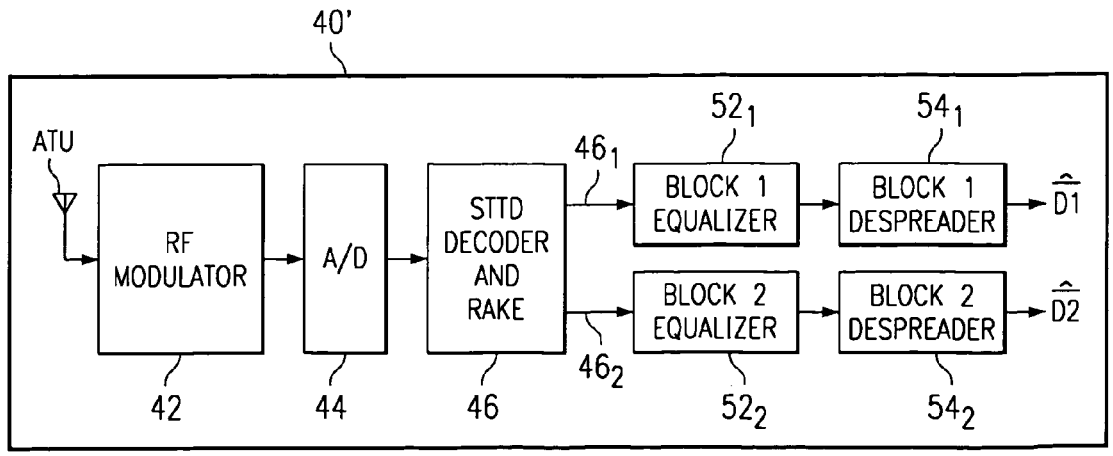
FIG. 8*b* illustrates a functional block diagram of an alternative preferred receiver station for receiving and processing the signals transmitted using the modulator of FIG. 7.

Before discussing the operation of receiver 40, note that FIG. 8b illustrates a block diagram of a receiver 40' as a second embodiment for receiving signals communicated from modulator 20' of FIG. 7. Receiver 40' is identical to receiver 40 with the exception of the implementation of the ordering of its despreading and block equalizing functions, that is, the order of connection of these functions is swapped. Specifically, the two outputs 46$_1$ and 46$_2$ of STTD decoder and RAKE 46 are connected as inputs to block 1 equalizer 52$_1$ and block 2 equalizer 52$_2$, respectively. The output of block 1 equalizer 52$_1$ is connected as an input to a block 1 despreader 54$_1$, and the output of block 2 equalizer 52$_2$ is connected as an input to a block 2 despreader 54$_2$. Further, the outputs of block 1 despreader 54$_1$ and block 2 despreader 54$_2$ provide $\hat{D1}$ and $\hat{D2}$, respectively.

The operation of receivers 40 and 40' is now described, where the following also demonstrates how the operation of both receivers is similar and why the order of the despreading function relative to the equalizing function may be reversed as shown mathematically below. In addition, from the following operational description, one skilled in the art may develop various hardware and/or software techniques for implementing these block devices. Turning now to the operation of receiver 40 (and 40'), let the following Equations 34 and 35 represent the Z transform of the channel impulse response from antennas AT$_1$ and AT$_2$, respectively:

$$H_1(Z) = \Sigma H_1(n) Z^{-n} \qquad \text{Equation 34}$$

$$H_2(Z) = \Sigma H_2(n) Z^{-n} \qquad \text{Equation 35}$$

Accordingly, the received signal for the two sub-blocks is given by the following Equations 36 and 37:

$$\bar{R}1(z) = H_1(Z)\bar{X}1(Z) - H_2(Z)\bar{X}2^*(Z) = \bar{N}1(Z) \qquad \text{Equation 36}$$

$$\bar{R}2(z) = H_1(Z)\bar{X}2(Z) + H_2(Z)\bar{X}1^*(Z) = \bar{N}1(Z) \qquad \text{Equation 37}$$

The second sub-block as shown in Equation 37 can be rewritten as in the following Equation 38:

$$\bar{R}2^*(z^{-1}) = H_1^*(Z^{-1})\bar{X}2^*(Z^{-1}) + H_2^*(Z^{-1})\bar{X}1(Z) = \bar{N}2^*(Z^{-1}) \qquad \text{Equation 38}$$

Equation 38 implies that we can now write the matrix equation shown in the following Equation 39:

$$\Omega = \begin{bmatrix} H_1(Z) & -H_2(Z) \\ H_2^*(Z^{-1}) & H_1^*(Z^{-1}) \end{bmatrix}^H \qquad \text{Equation 40}$$

$$= \begin{bmatrix} H_1^*(Z^{-1}) & H_2(Z) \\ -H_2^*(Z^{-1}) & H_1(Z) \end{bmatrix}_{2 \times 2}$$

According to processing theory in a manner comparable to Equation 27 for an earlier embodiment, the effect of that matched filter, such as implemented in STTD decoder and RAKE 46, may be stated as in the following Equation 40 and which also therefore provides guidance as to the preferred operational configuration the matched filter functionality within STTD decoder and RAKE 46 so that it achieves the factor of:

$$\begin{bmatrix} \bar{R}1(Z) \\ \bar{R}2^*(Z^{-1}) \end{bmatrix}_{2 \times 2} = \begin{bmatrix} H_1(Z) & -H_2(Z) \\ H_2^*(Z^{-1}) & H_1^*(Z^{-1}) \end{bmatrix}_{2 \times 2} \qquad \text{Equation 39}$$

$$\begin{bmatrix} \bar{X}1(Z) \\ \bar{X}2^*(Z^{-1}) \end{bmatrix}_{2 \times 2} +$$

$$\begin{bmatrix} \bar{N}1(Z) \\ \bar{N}2^*(Z^{-1}) \end{bmatrix}_{2 \times 2}$$

where again the notation $[\ ]^H$, denotes the conjugate transpose of a matrix. Next, the effect provided by the Equation 40 matched filter can be multiplied times both sides of Equation 39, yielding the following Equation 41:

$$\Omega = \begin{bmatrix} \bar{R}1(Z) \\ \bar{R}2^*(Z^{-1}) \end{bmatrix}_{2 \times 2} = \Omega * \begin{bmatrix} H_1(Z) & -H_2(Z) \\ H_2^*(Z^{-1}) & H_1^*(Z^{-1}) \end{bmatrix} \qquad \text{Equation 41}$$

$$\begin{bmatrix} \bar{X}1(Z) \\ \bar{X}2^*(Z^{-1}) \end{bmatrix} +$$

$$\Omega * \begin{bmatrix} \bar{N}1(Z) \\ \bar{N}2^*(Z^{-1}) \end{bmatrix}$$

Let the following Equation 42 in terms of $\Lambda$ be substituted for the data-related multiplicand matrices of Equation 41:

$$\Omega * \begin{bmatrix} H_1(Z) & -H_2(Z) \\ H_2^*(Z^{-1}) & H_1^*(Z^{-1}) \end{bmatrix} = \begin{bmatrix} \Lambda & 0 \\ 0 & \Lambda \end{bmatrix}_{2 \times 2} \qquad \text{Equation 42}$$

where $\Lambda = H_1^*(Z^{-1})H_1(Z) + H_2(Z)H_2^*(Z^{-1})$. Note also with respect to Equation 42 that in the case of receivers 40 and 40', and as a result of the code reversal from modulator 20' of FIG. 7, the diagonal of the matrix based on $\Lambda$ equals zero rather than approximating zero as is the case for modulator 20 as described in connection with Equations 29 and 30. As a result, an even greater reduction in ISI is anticipated with these embodiments.

Having derived the filtering operation of STTD decoder and RAKE 46 in Equation 42, it may be substituted into Equation 41 to yield the following Equation 43:

$$\Omega * \begin{bmatrix} \bar{R}1(Z) \\ \bar{R}2^*(Z^{-1}) \end{bmatrix} = \begin{bmatrix} \Lambda & 0 \\ 0 & \Lambda \end{bmatrix} \begin{bmatrix} \bar{X}1(Z) \\ \bar{X}2^*(Z^{-1}) \end{bmatrix} + \qquad \text{Equation 43}$$

$$\Omega * \begin{bmatrix} \bar{N}1(Z) \\ \bar{N}2^*(Z^{-1}) \end{bmatrix}$$

From Equation 43, in order to obtain the data two additional operations are required and it is now shown how such operations are achieved by the despreading and equalizing functions in FIGS. 8a and 8b, irrespective of the ordering thereof. Specifically, in either FIG. 8a or FIG. 8b, one set of despreading and equalizing functions (i.e., either 48$_1$ and 50$_1$ or 52$_1$ and 54$_1$) receives a set of signals from the matched filter operation of STTD decoder and RAKE 46 corresponding to time n=1 (i.e., both the non-manipulated symbols and codes sent via antenna AT1$_1$ and the manipulated symbols and codes sent via antenna AT1$_2$), while another set of despreading and equalizing functions (i.e., either 48$_2$ and 50$_2$ or 52$_2$ and 54$_2$) receives a set of signals from the matched filter operation of STTD decoder and RAKE 46 corresponding to time n=2. Here, the derivation of Equation 43 and the observations giving rise to it indicate that both of these sets of signals may be multiplied times the inverse of the matrix pertaining to Λ, but the result relates to the combination of the data and multiplied code as shown in Equation 33 rather than directly to the data as was the case in FIGS. 6a and 6b. Thus, in order to retrieve the data the preferred embodiment uses despreading (e.g., blocks $48_1$ and $48_2$, or blocks $54_1$ and $54_2$) after STTD decoder and RAKE 46 to remove the code from the result and also equalizers (e.g., block $50_1$ and $50_2$ or $52_1$ and $52_2$) to multiply times the inverse of the matrix pertaining to Λ. As a result, both outputs $\hat{D1}$ and $\hat{D2}$ are preferably determined in response to the inverse of the common matrix pertaining to Λ (i.e., $\Lambda^{-1}$) as well as the code removal. In addition, because the despreading function and the equalizing functions are linear operations, then the order these two functions can be swapped thereby giving rise to either receiver 40 of FIG. 8a or receiver 40 of FIG. 8b. Still further, note with respect to FIGS. 8a and 8b that one combination of a despreader and equalizer is operable to output an estimate of the signal which reflects the channel of transmission from antenna $AT_1$ and separately another combination of a despreader and equalizer 38 is operable to output an estimate of the signal which reflects the channel of transmission from antenna $AT_2$. Again, the separate determinations arise from the distinct inputs, and can be achieved using dual hardware/software in parallel operation or the same hardware/software in serial operation. In either event, however, complexity is relatively reduced due to the result of finding a zero diagonal for the matrix pertaining to Λ. Once $\hat{D1}$ and $\hat{D2}$ are obtained, they may be used further or processed by receiver 30 (or 30') in manners ascertainable by one skilled in the art.

Having detailed the implementation and operation of modulator 20' and two alternative preferred receivers 40 and 40' for processing its signals, note further that the realization of Equation 33 also gives rise to two additional embodiments based on which alternative method of data transfer is implemented in the CDMA system, that is, whether the system is communicating TDD or FDD data. Specifically, in a first embodiment providing a TDD system, each code $C^n$ may represent a product of a Walsh code and a scrambling code. As known in the art, each of the Walsh code and the scrambling code has a period equal to a symbol, that is, the number of chips in each code is equal to the number of chips in the symbol. Thus, to accomplish a time reversal of such a code, each code chip is reversed in time. In other words, for a product of a Walsh code and a scrambling code having chips $P_0$ through $P_{n-1}$, the time reversal of that code, as provided as a multiplicand by one of code multipliers $24_2^1$ through $24_2^L$, is $P_{n-1}$ through $P_0$. Thus, to achieve code reversal in connection with a symbol $S_j$, the corresponding code multiplier $24_2^1$ through $24_2^L$ determines the following product in Equation 44:

$$\text{product} = \{S_j \times P_{n-1}, S_j \times P_{n-2}, \ldots, S_j \times P_0\} \quad \text{Equation 44}$$

However, in a second embodiment providing an FDD system, first note that it is known that FDD systems implement a so-called long code in addition to a Walsh code. In applying the preferred embodiment to such a system, each multiplicand code $C^n$ therefore may represent the product of both the Walsh code and the long code. The Walsh code is time reversed in the same manner as shown in Equation 28 on a chip basis. The long code, however, has a duration far greater than that of a single symbol. Specifically, a long code count has a period equal to $2^{24}-1$ chips. By way of example, therefore, for a typical chip rate equal to 1.2288 MHz, then each long code is approximately 3,579,139 seconds or approximately 41.425 days long. Preferably, therefore, modulator 20' would not seek to reverse in time this considerably lengthy long code. Instead, in a preferred embodiment as applied to an FDD system, only the long code chips pertaining to a given block of symbols are time reversed prior to the multiplication times that symbol. For example, consider again the example of symbols shown in FIG. 4 and illustrated as blocks $D_1^{-1}(1)$ and $D_1^{-1}(2)$, as also set forth earlier in Equations 1 and 2. Additionally, assume these same blocks were processed in modulator 20' of FIG. 7. Thus, for block $D_1^{-1}(2)$ without time reversal of the symbols and the Walsh code, then symbol $S_5$ would be multiplied times the Walsh code (i.e., $W_0$ through $W_{n-1}$) and also times long code chips $LCC_x$ through $LCC_{x+n-1}$, respectively, while symbol $S_6$ would be multiplied times the Walsh code and also times long code chips $LCC_{x+n}$ through $LCC_{x+2n}$, respectively, while symbol $S_7$ would be multiplied times the Walsh code and also times long code chips $LCC_{x+2n+1}$ through $LCC_{x+3n}$, respectively, and finally symbol $S_8$ would be multiplied times the Walsh code and also times long code chips $LCC_{x+3n+1}$ through $LCC_{x+4n}$, respectively. However, in the present embodiment, the long code is time reversed by reversing the entire number of long chips corresponding to the block of symbols, and in the present example therefore chips $LCC_x$ through $LCC_{x+4n}$, corresponding to the block of symbols $D_1^{-1}(2)$, are time reversed (also, the Walsh code is time reversed as explained above). As a result, code multiplier $24_2^{-1}$ determines the following four product sequences shown in Equations 45 through 48:

$$\text{product} = \begin{cases} (-S_8)^* \times LCC_{x+4n-1}, \\ (-S_8)^* \times W_{n-2} \times LCC_{x+4n-3}, \ldots, \\ (-S_8)^* \times W_{n-1} \times LCC_{x+4n-2}, \\ (-S_8)^* \times W_0 \times LCC_{x+3n} \end{cases} \quad \text{Equation 45}$$

$$\text{product} = \begin{cases} (-S_7)^* \times W_n \times LCC_{x+3n-1}, \\ (-S_7)^* \times W_{n-2} \times LCC_{x+3n-3}, \ldots, \\ (-S)^* \times W_{n-1} \times LCC_{x+3n-2}, \\ (-S_7)^* \times W_0 \times LCC_{x+2n} \end{cases} \quad \text{Equation 46}$$

$$\text{product} = \begin{cases} (-S_6)^* \times W_n \times LCC_{x+2n-1}, \\ (-S_6)^* \times W_{n-2} \times LCC_{x+2n-3}, \ldots, \\ (-S_6)^* \times W_{n-1} \times LCC_{x+2n-2}, \\ (-S_6)^* \times W_0 \times LCC_{x+n} \end{cases} \quad \text{Equation 47}$$

$$\text{product} = \begin{cases} (-S_5)^* \times W_{n-1} \times LCC_{x+n-1}, \\ (-S_5)^* \times W_{n-3} \times LCC_{x+n-3}, \ldots, \\ (-S_5)^* \times W_{n-2} \times LCC_{x+n-2}, \\ (-S_5)^* \times W_0 \times LCC_x \end{cases} \quad \text{Equation 48}$$

From Equations 45 through 48, one skilled in the art also will appreciate how comparable code reversal is also applied with respect to block $D_1^{-1}(1)$, where the long code chips that would be applied to the manipulated symbols of that block also would be time reversed over all chips corresponding to that block.

The preceding FIGS. 6a and 6b versus 8a and 8b also may be compared to draw one additional observation regarding the alternatives provided therein and in view of the modulators 20 and 20' transmitting signals to those receivers. Specifically, as to receiver 40' of FIG. 8b, note that its despreading operations (i.e., blocks $54_1$ and $54_2$) can follow its equalization whereas for receiver 40 of FIG. 8a as well as for receivers 30 and 30' of FIGS. 6a and 6b, the despreading operation precedes equalization. With respect to receiver 40', therefore, it may be advantageous in the cases when the receiver does not have any knowledge of the other user codes being transmitted in the base station.

From the above, it may be appreciated that the above embodiments provide a wireless communication network including a transmitter and receiver, wherein the transmitter communicates signals using transmit antenna diversity in a manner that reduces ISI and the receiver has reduced device complexity as a result thereof. As a result, overall network performance is improved. Further, while the present embodiments have been described in detail, various substitutions, modifications or alterations could be made to the descriptions set forth above without departing from the inventive scope, as is evident from many variations set forth by examples above. As another example, while CDMA/WCDMA has been demonstrated as the preferred wireless environment, other wireless systems may implement the preferred embodiment. As still another example, while the receivers illustrated above depict a single receive antenna, one skilled in the art may readily adopt the preceding teachings to multiple receive antennas. Thus, these observations as well as others ascertainable by one skilled in the art further illustrate the inventive scope, as defined by the following claims.

The invention claimed is:

1. A wireless transmitter, comprising:
   a plurality of antennas, wherein each of the plurality of antennas is operable for transmitting signals;
   for each of a plurality of different user channels, circuitry for providing a plurality of groups of symbols in a first symbol group sequence;
   for each of the plurality of different user channels, circuitry for forming a first modulated symbol group sequence for the user channel by modulating the symbols in the first symbol group sequence for the user channel with a unique code that corresponds to the user channel and distinguishes the user channel from each other of the plurality of different user channels;
   circuitry for combining the first modulated symbol group sequence for each of the plurality of different user channels such that a first combined modulated symbol sequence is provided to and transmitted by a first antenna in the plurality of antennas;
   for each of the plurality of different user channels, circuitry for forming a second symbol group sequence by time reversing symbols in at least some of the plurality of groups of symbols to form the second symbol group sequence different from the first symbol group sequence;
   for each of the plurality of different user channels, circuitry for forming a second modulated symbol group sequence for the user channel by modulating the symbols in the second symbol group sequence for the user channel with a unique code that corresponds to the user and distinguishes the user from each other of the plurality of different user channels; and
   circuitry for combining the second modulated symbol group sequence for each of the plurality of different user channels such that a second combined modulated symbol sequence is provided to and transmitted by the second antenna.

2. The wireless transmitter of claim 1 wherein the unique code used by the circuitry for forming a first modulated symbol group sequence is the same for a given user channel in the plurality of different user channels as the unique code used by the circuitry for forming a second modulated symbol group sequence.

3. The wireless transmitter of claim 1 wherein the unique code used by the circuitry for forming a first modulated symbol group sequence is time reversed for a given user channel in the plurality of different user channels relative to the unique code used by the circuitry for forming a second modulated symbol group sequence.

4. The wireless transmitter of claim 1 wherein the wireless transmitter further comprises circuitry for buffering a number of groups of symbols for each of the plurality of different user channels, wherein the number of groups of symbols equals the number of the plurality of antennas.

5. The wireless transmitter of claim 4 wherein the number of the plurality of antennas equals two antennas.

6. The wireless transmitter of claim 1 wherein the circuitry for forming a second symbol group sequence forms the second symbol group sequence further by determining a complex conjugate of the symbols in the first symbol group sequence.

7. The wireless transmitter of claim 6 wherein the circuitry for forming a second symbol group sequence forms the second symbol group sequence further by determining a negative of the symbols in selected groups of symbols within the first symbol group sequence.

8. The wireless transmitter of claim 1 wherein the transmitter is operable in a time division duplex mode.

9. The wireless transmitter of claim 8 code wherein each of the unique codes comprises a product of a Walsh code and a scrambling code, wherein each of the Walsh code and the scrambling code comprise a number of chips in a symbol.

10. The wireless transmitter of claim 9:
    wherein the Walsh code consists of a number of chips and each symbol consists of a same number of chips as the number of chips in the unique code; and
    wherein the unique code used by the circuitry for forming a first modulated symbol group sequence is time reversed for a given user channel in the plurality of different user channels relative to the unique code used by the circuitry for forming a second modulated symbol group sequence.

11. The wireless transmitter of claim 1 wherein the transmitter is operable in a frequency division duplex mode.

12. The wireless transmitter of claim 11 wherein each of the unique codes comprises a product of a Walsh code and a long code.

13. The wireless transmitter of claim 12:
    wherein each group of the groups of symbols in the first symbol group sequence has a first number of chips;
    wherein the long code consists of a second number of chips greater than the first number of chips; and
    wherein the unique code used by the circuitry for forming a first modulated symbol group sequence is time reversed for a given user channel in the plurality of different user channels relative to the unique code used by the circuitry for forming a second modulated symbol group sequence by time reversing the first number of chips in the long code.

14. The wireless transmitter of claim 1 wherein the transmitter comprises a WCDMA transmitter.

* * * * *